(12) United States Patent
Sheidler et al.

(10) Patent No.: US 7,945,378 B2
(45) Date of Patent: May 17, 2011

(54) METHOD OF SELECTING ENGINE TORQUE CURVES

(75) Inventors: Alan D. Sheidler, Moline, IL (US); Rodney A. Schindler, Waterloo, IA (US); Chris Bursiek, Geneseo, IL (US)

(73) Assignee: Deere & Company, Moline, IL (US)

( * ) Notice: Subject to any disclaimer, the term of this patent is extended or adjusted under 35 U.S.C. 154(b) by 289 days.

(21) Appl. No.: 12/235,042

(22) Filed: Sep. 22, 2008

(65) Prior Publication Data

US 2010/0076662 A1  Mar. 25, 2010

(51) Int. Cl.
*B60T 7/12* (2006.01)
(52) U.S. Cl. ........................................ 701/110; 123/350
(58) Field of Classification Search .......... 701/102–105, 701/110, 111, 115; 123/350, 352, 357, 356, 123/406.23, 406.24
See application file for complete search history.

(56) References Cited

U.S. PATENT DOCUMENTS

| | | | | |
|---|---|---|---|---|
| 4,445,477 A | * | 5/1984 | Ikeura | 123/406.53 |
| 4,452,209 A | * | 6/1984 | Ohara et al. | 123/684 |
| 4,550,816 A | * | 11/1985 | Sakakiyama | 477/87 |
| 4,993,394 A | * | 2/1991 | McKay et al. | 123/533 |
| 5,778,857 A | * | 7/1998 | Nakamura et al. | 123/406.37 |
| 6,012,289 A | * | 1/2000 | Deckard et al. | 60/602 |
| 6,062,025 A | * | 5/2000 | Okada et al. | 60/602 |
| 6,655,351 B2 | * | 12/2003 | Sheidler et al. | 123/396 |
| 2008/0060858 A1 | * | 3/2008 | Sheidler et al. | 180/65.2 |

* cited by examiner

Primary Examiner — John T Kwon
(74) Attorney, Agent, or Firm — Taylor IP, P.C.

(57) ABSTRACT

A method of operating an internal combustion engine including the steps of detecting, determining, and switching. The detecting step detects a load on the engine. The determining step determines if the load is below a predetermined value. The switching step switches the engine to operate at a selected one of a plurality of torque power curves, dependent upon the determining step.

16 Claims, 8 Drawing Sheets

METHOD OF SELECTING ENGINE TORQUE CURVES

FIELD OF THE INVENTION

The present invention relates to work vehicles, and, more particularly to the selection of an engine torque curve for use by an engine of an agricultural harvester.

BACKGROUND OF THE INVENTION

An agricultural harvester, such as a combine, is a large machine used to harvest a variety of crops from a field. A combine includes a header at the front of the combine to cut the ripened crop in the field. A feeder housing supporting the header transfers the crop material into the combine for threshing. The threshing and separating assemblies within the combine remove grain from the crop material and transfer the clean grain to a grain tank for temporary holding. Crop material other than grain exits from the rear of the combine and is distributed upon the field. An unloading auger or conveyor transfers the clean grain from the grain tank to a transport vehicle.

Off highway vehicles, such as combine harvesters, currently have a basic engine torque curve to provide a nominal rated power at a power level approximately 14% below the power capability envelope of the engine. This enables the use of a power boost for unloading or a power bulge for additional power to handle gradual increases in a load or to handle slugs or other operational overloads without excessive loss of functional engine speed or the stalling of the engine. Traditional engine torque curves for combines have been developed to use this high level of power bulge above the normal rated power in order to enhance the ability of the power train and threshing system to handle the slugs and transient overloads during the harvesting operation. Such an overload may occur when clumps of moist material suddenly enter the threshing system causing higher, short duration overloads.

Experience has shown that 14% power bulge (from 2,200 rpm rated speed down to 2,000 rpm peak power) provides good slug handling capability and enhanced drivability for the operator.

At the lower power end of the operational spectrum, work vehicles such as combines also spend significant time at very light loads, such as idling or going down hills. In these cases, the high end torque curves that work well for performance, such as slug acceptance, high threshing loads, unloading grain on the go, etc., do not return as good of fuel economy as an engine torque curve optimized for a lower power level operation. In addition, after treatment devices the are used to meet the Environmental Protection Agency's Tier 4 requirements need to operate at temperatures of around 300° Celsius or higher in order to regenerate the after treatment device, and these temperatures are typically not achieved when a high power torque curve equipped engine is operated at light loads. In order to maintain the high temperature, additional fuel is burnt in the exhaust to elevate the temperature of the exhaust, thus exacerbating the fuel consumption problem.

What is needed in the art is a system to modify torque curves dependant upon operational needs.

SUMMARY OF THE INVENTION

The invention in one form is directed to a method of operating an internal combustion engine including the steps of detecting, determining, and switching. The detecting step detects a load on the engine. The determining step determines if the load is below a predetermined value. The switching step switches the engine to operate at a selected one of a plurality of torque power curves, dependent upon the determining step.

The invention in another form is directed to a control system for operation of an internal combustion engine, including an engine load detecting device and an engine controller. The engine load detecting device produces a signal representative of a load on the engine. The engine controller receives the signal and is configured to determine if the signal is below a predetermined value. The engine controller is also configured to switch an operating torque curve of the engine to one of a plurality of torque power curves depending upon whether the signal is below the predetermined value.

DETAILED DESCRIPTION OF THE INVENTION

Figure 1:
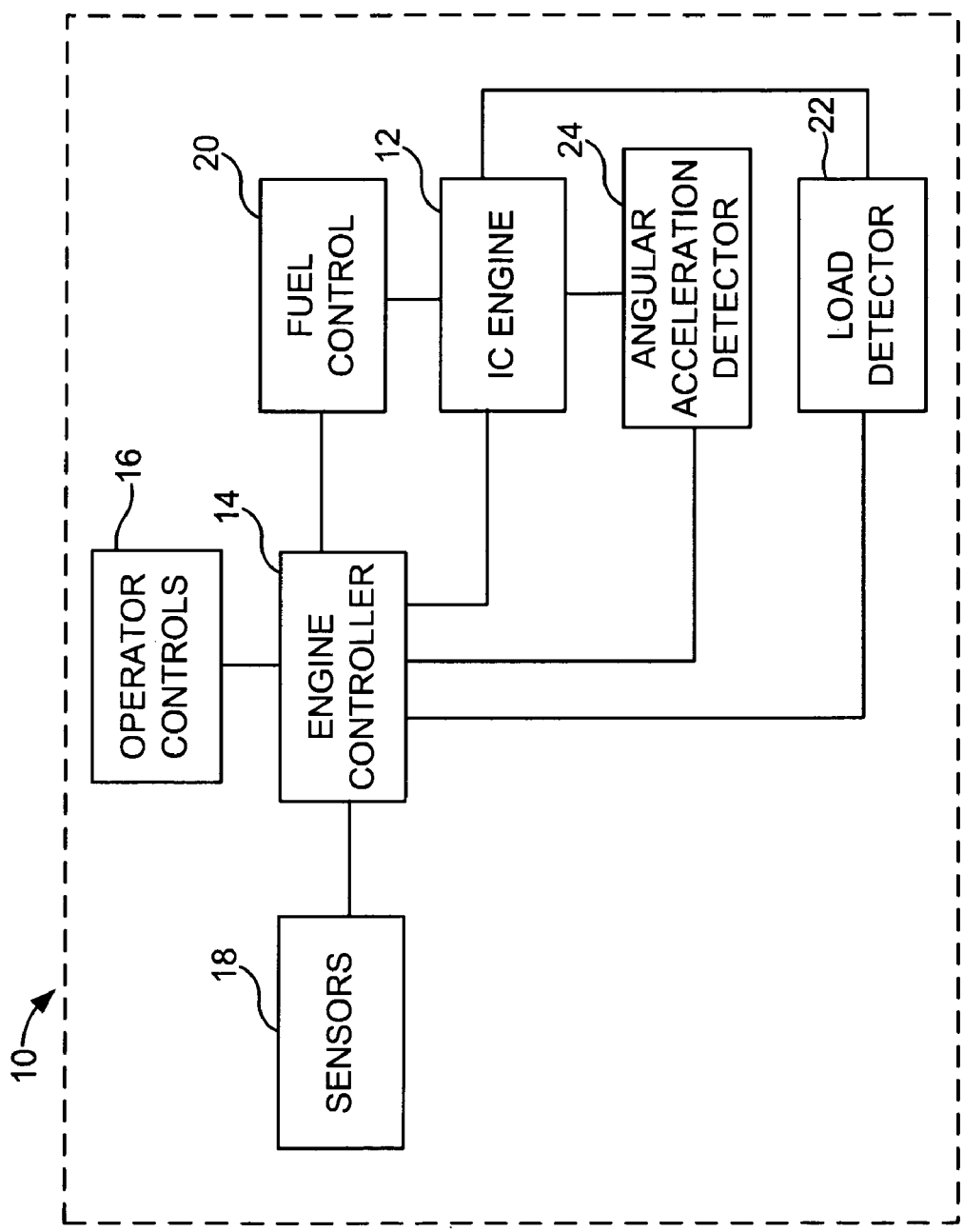
FIG. 1 is a schematical view of a work vehicle system having an internal combustion engine utilizing an embodiment of the control system of the present invention.

Referring now to the drawings, and more particularly to FIG. 1, there is shown a schematical view of an embodiment of the work vehicle system 10 of the present invention for operating an internal combustion (IC) engine 12. System 10 is part of a non-road work vehicle such as an agricultural tractor, combine, construction equipment, etc. IC engine 12 is configured as a diesel engine, but could also possibly be configured as a spark ignition engine. IC engine 12 is sized to accommodate the non-road vehicle.

Work vehicle system 10 further includes an engine controller 14, operator control 16, sensors 18, a fuel control system 20, a load detector 22, and an angle acceleration detector 24. Engine controller 14 is located on board the non-road vehicle and controls various electronically controllable functions of the vehicle. For example, in the event the non-road vehicle is configured as a combine, engine controller 14 can control the engine rpm and other functional aspects of engine 12. Engine controller 14 may be in communication with a work vehicle controller, not shown, which may interface with operator controls 16. Input from operator controls 16, which may include a hand lever or a foot pedal under the control of an operator, provides an electrical signal to controller 14 indicative of the operator demand relative to engine 12. Though controller 14 has been illustrated as an engine controller 14, these elements may be incorporated and located with engine 12 or may be incorporated in another controller such as a work vehicle controller, not shown. Communication between controller 14 and the elements to which it is connected may be by way of electronic signals that can include address and data busses. The communication of information is shown schematically as well as the interaction of control signals by the interconnecting links between the boxes shown in FIG. 1.

Controller 14 receives information from sensors 18 that may relate to other aspects of work vehicle system 10 such as crop flow indicators, grain flow, attitude of the harvester platform, etc. Fuel control 20 is under control of controller 14, which may also provide information to controller 14, such as the flow of fuel per unit time that is being supplied to engine 12. Load detector 22 detects a load requirement being drawn by the combine, which is being supplied by engine 12. Angle acceleration detector 24 detects the angular acceleration of engine 12 which is indicative of the response of engine 12 to a load that is being encountered. Angle acceleration detector 24 may be a calculation performed by controller 14 based on input from sensors 18. Air/fuel ratio control is carried out by controller 14 as dictated by the selected torque curve.

Figure 2:
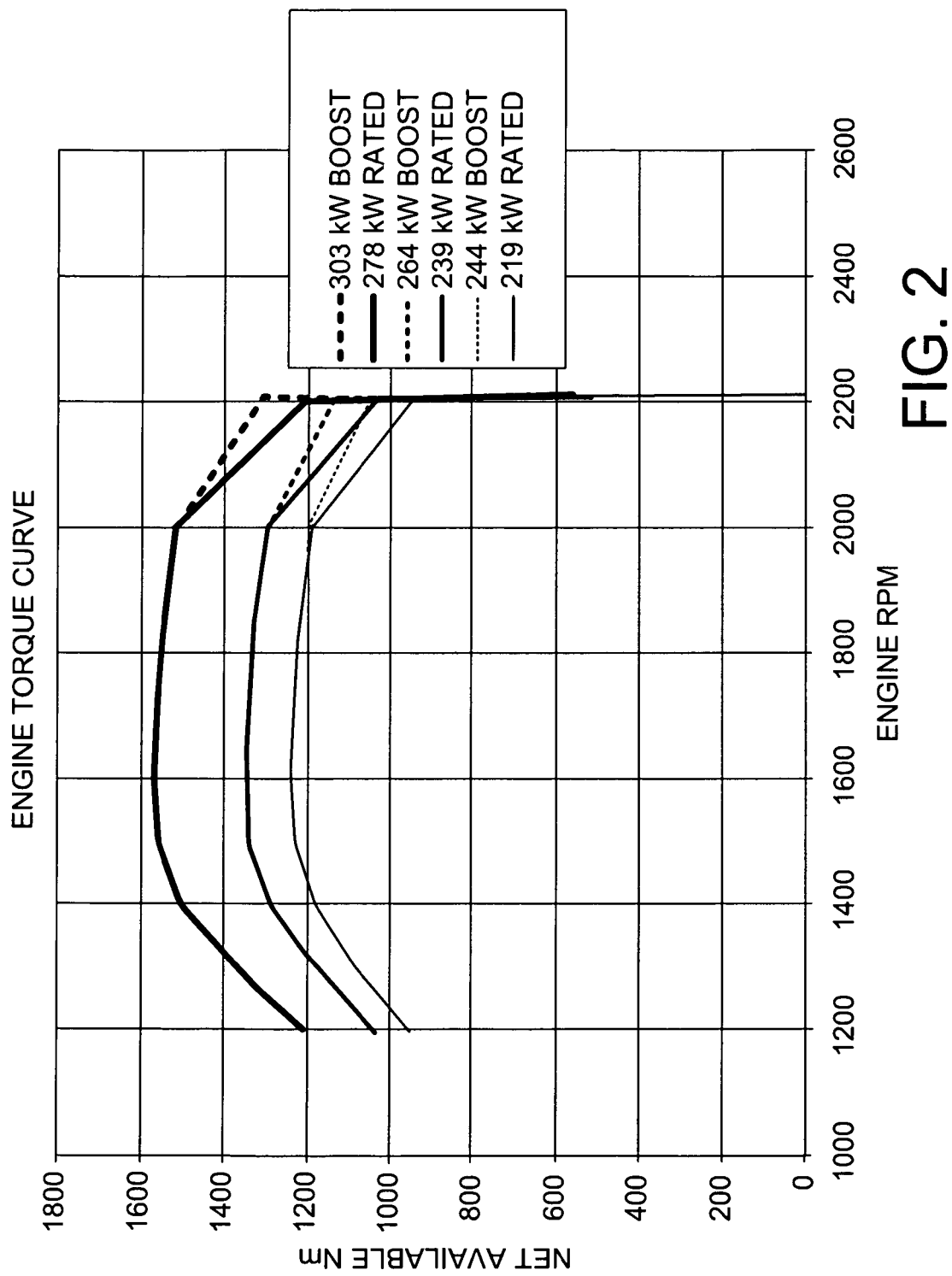
FIG. 2 are illustrative engine torque curves.

Now, additionally referring to FIG. 2, there is shown effectively six separate torque curves. Each of the rated torque curves has a torque boost portion for the higher rpm range for the engine. The numbers utilized here are representative and not meant to be limiting in the application of the present invention, but are only used to demonstrate one embodiment of the present invention as further illustrated in FIGS. 3-7. Now, additionally referring to FIGS. 3-7, there is schematically illustrated a method of the present invention. Method 100 includes the selection of the mode of operation of work vehicle 10 which occurs at step 102. This selection may be made by an operator or may be selected and locked into the system by someone other than the operator to prevent the operator from changing the operational mode. The selections allowed are normal mode operation 104, a smart mode operation 106 method and a flex boost mode 108. If the normal mode of operation is selected method 100 proceeds to step 110 whereupon the decision as to which machine system 10 is operating with is made, here illustrated abstractly, as machine X or Y and may represent different types of machines within the same family having different engine and accessory configurations. If method 100 is operated on machine X then method 100 proceeds to step 112 and controller 14 may inquire with the work vehicle controller as to whether grain is being unloaded from the combine, which may be undertaken as the rest of the systems on the combine are still functioning, thereby requiring additional power in order to appropriately unload grain as well as to keep all harvesting and threshing systems operating with sufficient power and at a proper speed. If the unloading system is engaged, method 100 proceeds to step 116 or to step 114 if the unloading system is not engaged. The selection illustrated at steps 114 and 116 are reflective of the two torque curves represented by the middle line of FIG. 2 of the 239 kilowatt rated curve and 264 kilowatt boost curve.

In a similar manner, if the machine is of type Y, method 100 proceeds to step 118 where again an inquiry is made as to whether the unloading system is engaged and if not then method 100 proceeds to step 120 where a 278 kilowatt rated curve is selected or if the unloading system is engaged the 303 kilowatt boost curve is selected at step 122.

If the smart mode is selected at step 106 then method 100 proceeds to step 124 where again the type of machine is determined and method 100 proceeds either to step 126 or to step 140. If the type of machine is type X then the determination is made as to whether the engine load is greater than 180 kilowatts, which may be a selected predetermined value, here illustrated as 180 kilowatts, and if the load is greater than the predetermined value method 100 proceeds to step 134 else it proceeds to step 128. Again in this example it is determined whether the unloading system is engaged at steps 128 and 134 and torque curves based upon engine load at step 126 are now selectively engaged, based upon the combination of engine load and the determination as to whether the grain unloading system is engaged. This results in elected torque curves of 219 kilowatts at step 130, 244 kilowatts at step 132, 239 kilowatts at step 136, and 264 kilowatts at step 138.

In a similar manner, if a different type of machine such as type Y is being utilized then method 100 proceeds to step 40 where the predetermined load is here illustrated as being above 200 kilowatts at step 140. If the engine load is less than 200 kilowatts then the method proceeds to step 142 and if it is greater than 200 kilowatts the method 100 proceeds to step 148. Here again a determination is made as to whether the unloading system is engaged at steps 142 and 148. If not, one selection of torque curve is made at steps 144 and 150 and if the unloading system is engaged then another torque curve is selected at steps 146 and 152.

If flex boost mode has been selected at step 108, method 100 proceeds to step 154 where again the type of machine is determined as either an X type or a Y type. If the X type machine is running method 100 then it proceeds to step 156. An angular acceleration of engine 12 is detected by angular acceleration detector 24 and if the angular acceleration is less than a predetermined value, such as $-10.0$ rad/s$^2$ or if the unloading system is engaged then method 100 proceeds to step 160 where a torque boost curve is selected at a value of 264 kilowatts. If neither of the conditions of step 156 is met then method 100 proceeds to step 158 where the 239 kilowatt rated torque curve is selected for operation of the vehicle.

In a similar manner, if a type Y machine is selected then a determination is made at step 162 as to whether the angular acceleration is less than a predetermined amount or the unloading system is engaged to thereby cause the selection of 303 kilowatt boost curve at step 166. If neither of the conditions of step 162 is met then a 278 kilowatt rated torque curve is selected at step 164.

Figure 3:
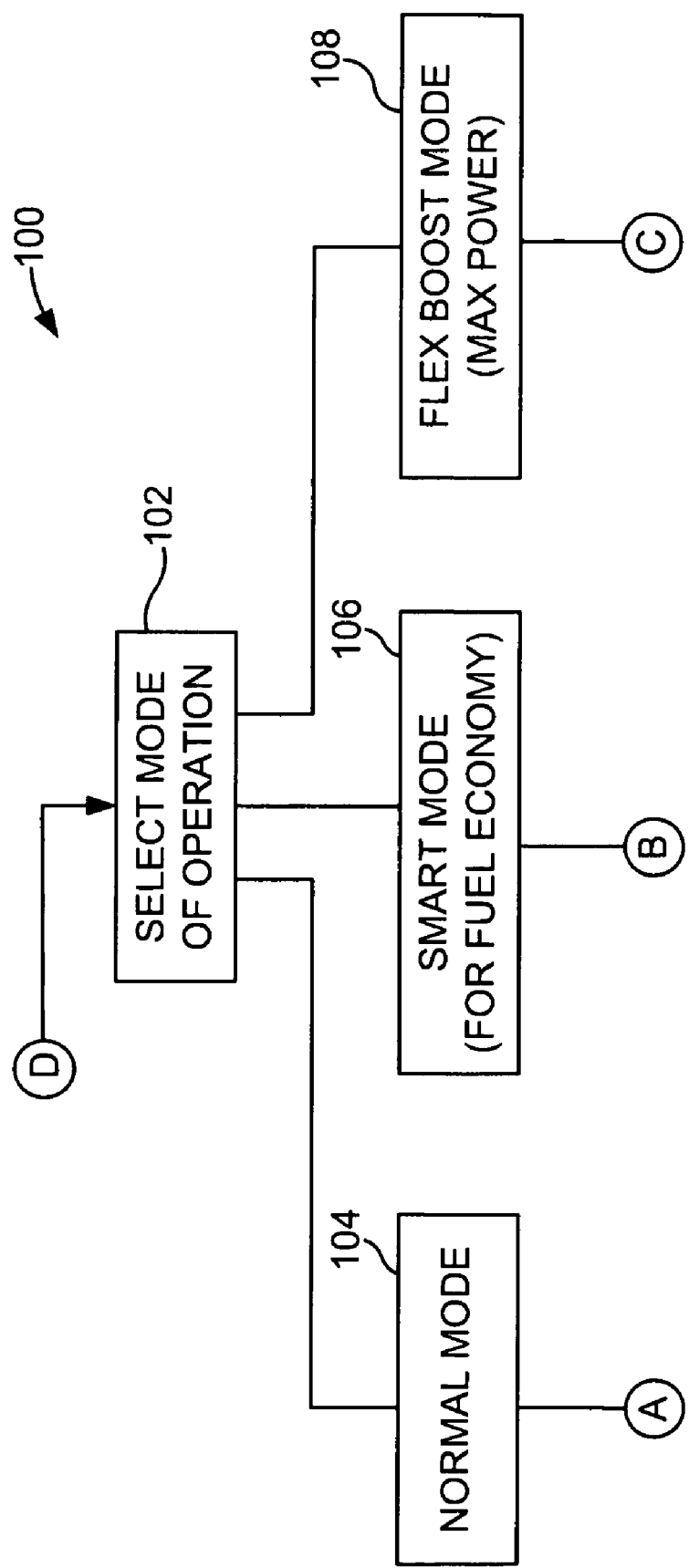
FIG. 3 illustrates a portion of a method of the present invention.
Figure 4:
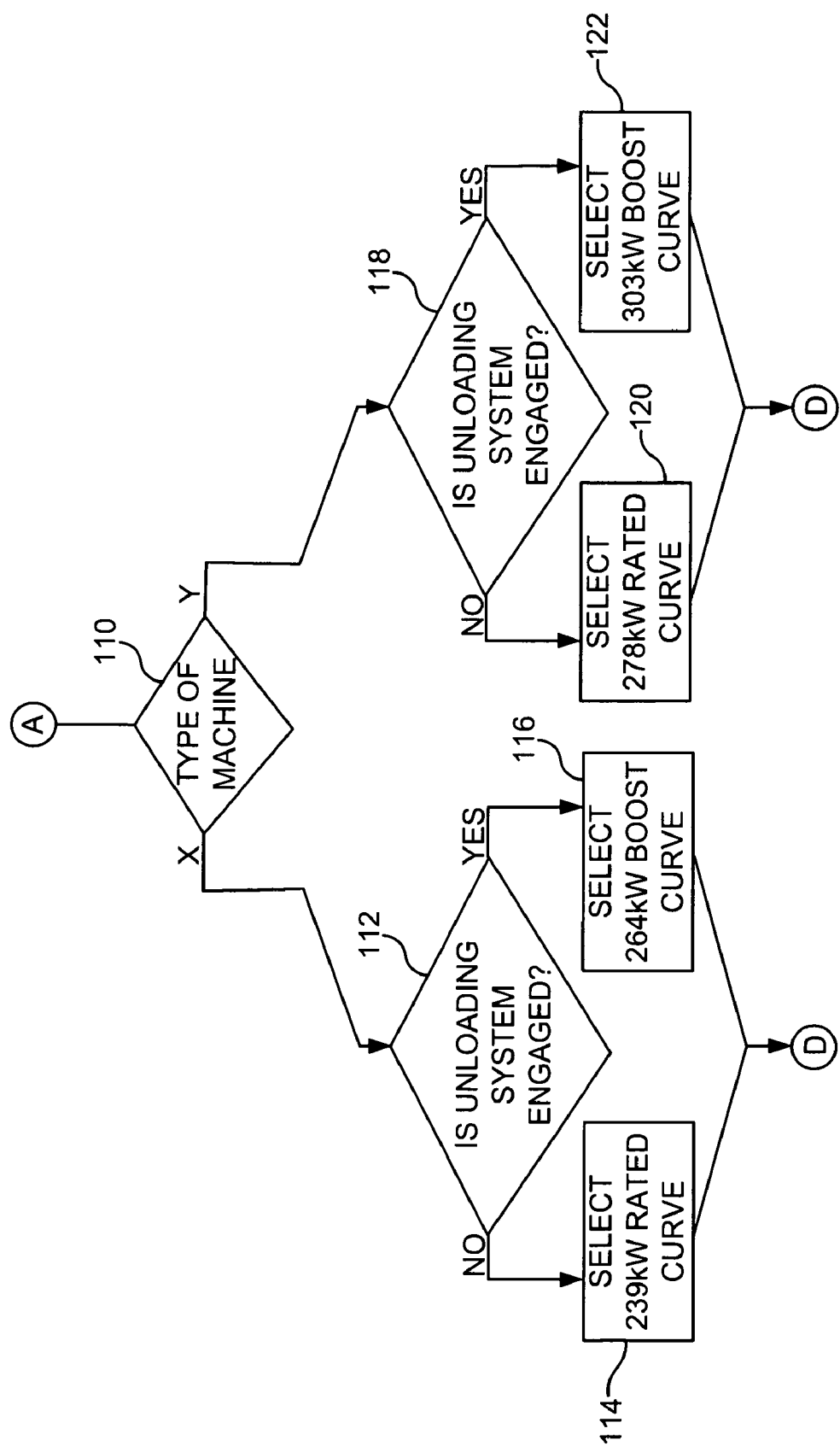
FIG. 4 further illustrates the method of FIG. 3.
Figure 5:
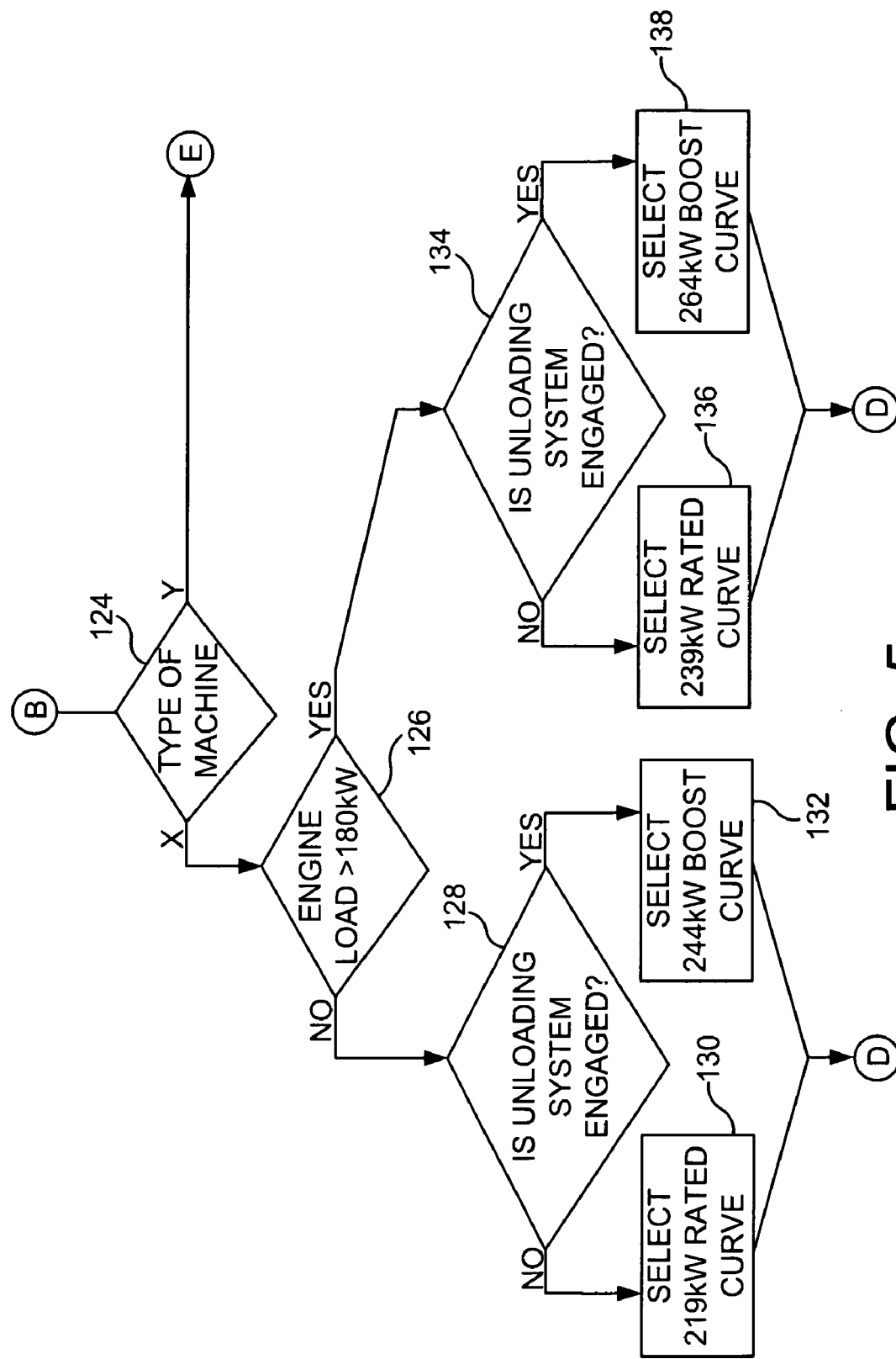
FIG. 5 further illustrates the method of FIGS. 3 and 4.
Figure 6:
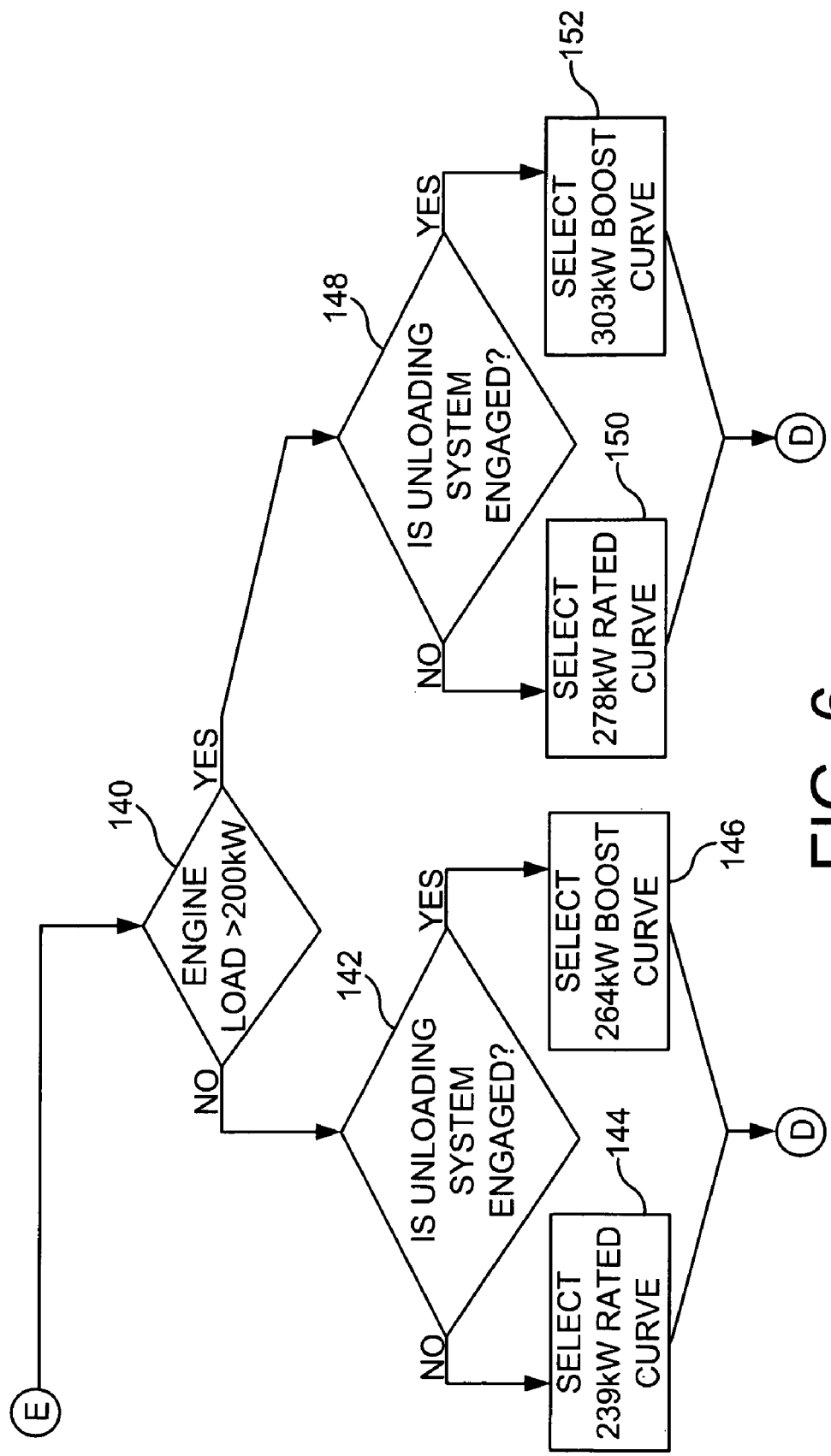
FIG. 6 further illustrates the method of FIGS. 3-5.
Figure 7:
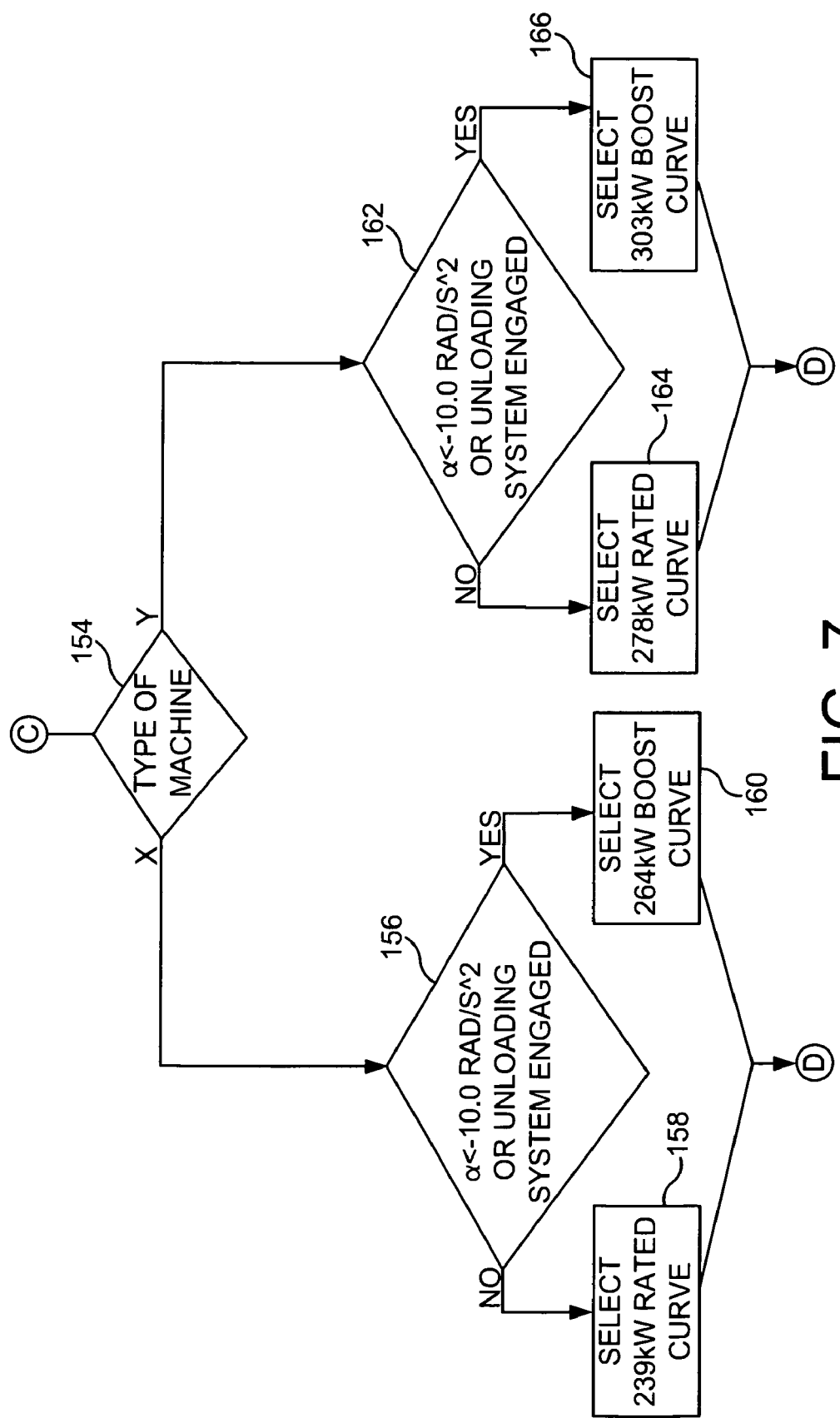
FIG. 7 further illustrates the method of FIGS. 3-6.

It is understood that the element represented as a D in the circle, which that is shown going back to FIG. 3 can also simply return to the decision point after which the type of machine has been selected and that inner loop of the method would continue to execute. Further, the numbers utilized for the torque curves are to be understood to be predetermined numbers, the numbers shown are merely illustrative in nature. In a like manner, the engine load numbers are illustrative in nature and represent predetermined numbers. This is also applicable to the angular acceleration measurement where negative acceleration, also known as a deceleration, is utilized to determine the load on an engine 12.

Figure 8:
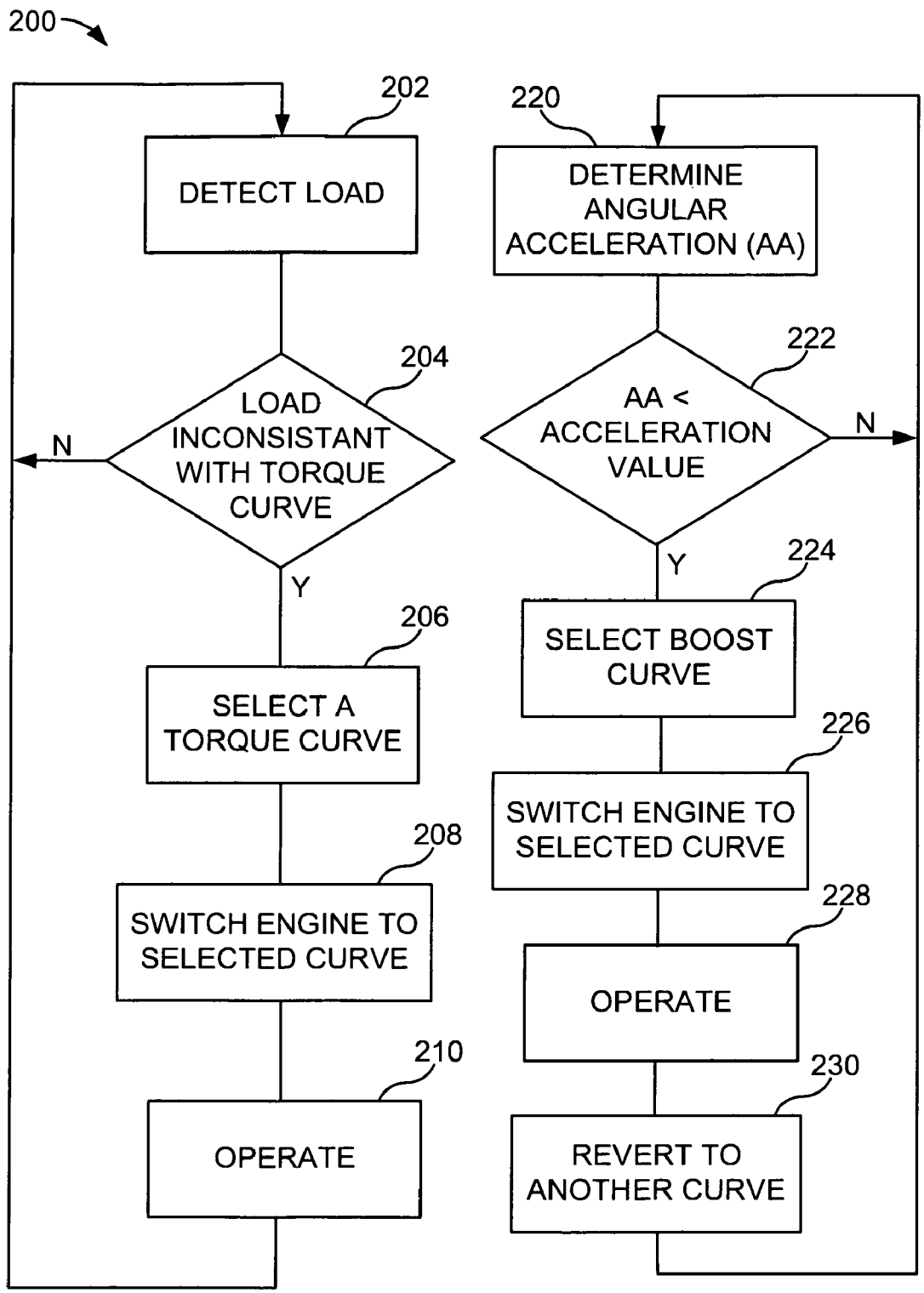
FIG. 8 illustrates another embodiment of the control system method of the present invention.

Now, additionally referring to FIG. 8 there is shown a method 200 having two substantially parallel operations and determine the selection of a torque curve dependent on criteria, which may be mutually exclusive so that only one of the two flows are being executed at any one time during the operation of engine 12. At step 202 a load is detected by load detector 22 and if the load is inconsistent with the current torque curve as determined at step 204, method 200 proceeds to step 206. At step 206, a new torque curve is selected and the method proceeds to step 208 where controller 14 switches the torque curve to which engine 12 will be subjected. At step 210 engine 12 is operated on the newly selected torque curve. If no load inconsistency is found at step 204 then method 200 reverts to step 202. It is anticipated that this series of steps would be executed when engine 12 is operating at a normal or low load such as when work vehicle 10 is going down a hill or idling. The selection of a new torque curve, such as might be represented as torque curve in FIG. 2 rated at 219 kilowatts versus a 303 kilowatt torque curve or even some other torque curve not illustrated in FIG. 2, would be selected to reduce fuel consumption and to keep exhaust temperature high so as to meet the EPA Tier 4 requirements. If the load detected by load detector 22 is gradually increasing then at steps 202-210 a higher torque curve, such as 239 kilowatt curve, will be selected and engine 12 would then continue to operate on the newly selected torque curve.

The elements that are shown on the right of FIG. 8 illustrate a system that receives priority when determined by angular acceleration detector 24 that the deceleration of engine 12 is occurring, which is presumably being caused by extra loading of the engine such as a slug passing through the threshing system. This portion of the embodiment illustrates a detected load whereas elements shown in FIGS. 4-7 also include some anticipated loads such as an unloading system being engaged. Here angular acceleration detector 24 determines angular acceleration at step 220 and at step 222 if the angular acceleration is less than a predetermined acceleration value then method 200 proceeds to step 224. If the angular acceleration is not less than the predetermined value then step 222 returns to step 220. At step 224 a boost curve is selected such as 264 kilowatt boost level if system 10 is operating at 239 kilowatt torque level. At step 226, engine 12 is switched to the selected curve and at step 228 engine 12 is operated at that newly selected curve until a further detected event occurs, such as the passage of time, at which time there is a reversion to a previous or another curve at step 230. At the conclusion of step 230 the method reverts back to step 220. The reversion at step 230 may occur after the passage of time such as a predetermined amount of time in the range of 5-10 seconds to accommodate the passage of a slug through the threshing system. It is also contemplated that other events such as a measurement of engine speed recovery, torque detection, fuel consumption rate, or boost pressure of a turbo may be measured to cause the execution of step 230.

Method 200 operates to improve fuel efficiency and maintain exhaust temperature of engine 12 when the left side of the method is operating at the lower load levels and boost power is provided by the method operating on the right side of the illustrated method. The determination of angular acceleration may only be operational if the engine speed is above a certain level so that a boost torque curve is not selected when engine 12 is in an idling condition.

The present invention advantageously provides multiple torque curves to cover a range of power levels from low to high load operation and a controller 14 that automatically senses engine load by way of load detector 22 and switches power torque curves to improve performance and/or fuel economy. Engine load detector 22 may be embodied in the monitoring of fuel flow rate, engine output shaft torque, turbocharger boost pressure, or other similar load related parameters. If the load that is detected is below a specified predetermined value then a low power torque curve is selected by controller 14. With an isochronous governor, the engine rpm will be maintained at a rate of speed, but the fuel economy of the engine is enhanced and the exhaust temperature (for a T4 engine) is maintained at a higher temperature to enable regeneration of the after treatment device. As load increases, controller 14 determines the need to move to a higher power torque curve and does so before the isochronous governor curve break-away point. The engine speed is then maintained, and the engine power can rise to meet the load for performance. The operator would not normally be cognizant of this shift in torque curve selections, even though they may be displayed for the operator's information.

Engine rpm may be maintained at the rate of speed, typically 2,200 rpm for a combine. If the engine has a very light load, such as transporting, idling, going down a hill, etc., controller 14 can select a very low torque curve for optimized fuel economy and elevated exhaust temperature for the after treatment function. For combines, field data collection has shown that typically 30% of the vehicle operation is at 50% load or less, thereby illustrating a usefulness of the present invention. If a traditional droop governor curve is used, instead of the isochronous governor curve, the functions of the illustrated invention can still be employed particularly as long as the same governor curve is employed for the various torque curves.

A further advantage of the present invention is that the traditional 14% power bulge for combines to handle slugs is improved. For example, in combines if a slug enters the operation system the torque output of the engine would be exceeded in this transient slug situation. When this happens, the engine rpm will drop very fast, so fast that an operator cannot respond adequately to the event. In this case, controller 14 may monitor the engine rpm compute the angular acceleration of the engine. For a combine, the mass-moment of inertia is typically 20 $kg/m^2$. During a slug, the transient load may exceed the engine torque output by as much as 50-100% for 2-4 seconds. This would result in an angular acceleration rate of $-10$ to $-30$ $rad/sec^2$. Controller 14 senses this quickly enough, say in less than 1/10 second, controller 14 then automatically selects the appropriate torque boost curve to provide, for example, a 25 kilowatt boost over the standard rate of power at 2,200 rpm. This allows for the power boost to be engaged very quickly before engine speed is dropped below the; isochronous 2,200 rpm. It is also possible to engage the boost before the engine has dropped below 2,190 rpm, for example. At that point, the engine would be delivering as much power as possible to overcome the slug before the engine speed has dropped down to 2,000 rpm, which may be the peak power point for the 14% power bulge. This present invention dramatically enhances the ability of the combine to handle transient slugs and separator overloads. Once the slug has passed through the machine, and the transient load drops off to normal, the need for boost power ceases. This is managed, for example, with a timer which can automatically cause controller 14 to down revert to the normal rated power curve after a delay of say 5-10 seconds. Alternatively, controller 14 may revert to a previous curve once the engine rpm returns to 2,200 rpm.

Alternatively, torque or fuel rate or boost pressure can be used to sense when it is appropriate to shut off the boost curve. It is not desirable to run on the boost curve all of the time, and to reserve the boost for unloading on the go and to enable smooth engagement of the unloading system. The idea is to engage the boost power for a short period of time to assist handling of slugs which cause a high angular deceleration rate detectable by angular acceleration detector 24. It is not typical for continuous high load conditions to exist. For example, if the operator pushes the machine too hard causing a high feed rate, the load on engine 12 will gradually rise and exceed the engine capacity. The angular deceleration rate in this situation is very much less than would happen in the event of a slug, and controller 14 will not automatically engage a boost torque curve since the load is continuous and slowly increasing. In this manner the combine operates no differently and the performance improvement would be preserved for when a slug feeding situation or unloading on the go is occurring.

The mode selection illustrated in FIG. 3 illustrates additional modes of operation that could be selected by operator control 16. In normal mode 104 the torque curves are predetermined and constant with a specified type of combine with boost only being selected when the unloading system is engaged. If smart mode is selected at step 106 controller 14 selects lower curves for fuel economy and after treatment function improvement. In the flex boost mode, there is allowed short duration engagement boosts of power to handle slugs. Advantageously if the transient load acceptance capability of engine 12 is improved, as is in the present invention, there exists the possibility to reduce the amount of reserve power, thereby requiring less than a 14% power bulge. If this is the case, then the power rating of combine can be increased by several percentage, such as 4-5% because of the transient response improvement afforded by the present invention.

The present invention allows controller to select the torque curve providing improved fuel economy whenever possible and to handle transient loads of the machine resulting in improved drivability and handling of the machine. This being accomplished without the operator sensing anything other than enhanced performance and/or reduced fuel consumption that the present invention affords to the operation of the vehicle. It is also anticipated that a torque curve can be selected based on the detection of exhaust temperature being outside of a predetermined range. This allows for efficient management of the exhaust temperature to preclude the addition of fuel to the exhaust system, thereby reducing fuel consumption.

Having described the preferred embodiment, it will become apparent that various modifications can be made without departing from the scope of the invention as defined in the accompanying claims.

The invention claimed is:

1. A method of operating an internal combustion engine, comprising the steps of:
    detecting a load on the engine;
    determining if said load is below a predetermined value, said detecting step includes the step of determining an angular acceleration of the engine;
    switching the engine to one of a plurality of torque power curves, dependent upon said determining step, said switching step further includes the steps of:
    selecting a boost curve from said plurality of torque power curves if said angular acceleration is below a predetermined acceleration value; and
    switching the engine to said boost curve.

2. The method of claim 1, further comprising the step of substantially maintaining the speed of the engine while said detecting, said determining and said switching steps are carried out.

3. The method of claim 1, further comprising the step of allowing a change in engine speed while said detecting, said determining and said switching steps are carried out.

4. The method of claim 1 wherein said predetermined acceleration value is −10 rad/sec$^2$.

5. The method of claim 1, wherein said switching step further includes reverting the engine to a previous torque curve from said boost curve upon detecting an event.

6. The method of claim 5, wherein said event is a passage of a predetermined amount of time.

7. The method of claim 6, wherein said predetermined amount of time is in a range of 5 to 10 seconds.

8. The method of claim 5, wherein said event is at least one of engine speed recovery, torque detection, fuel consumption rate and boost pressure.

9. The method of claim 1, wherein said switching step includes the step of selecting a torque power curve to at least one of increase fuel efficiency of the engine and maintain exhaust temperature of the engine dependant upon said determining step.

10. A control system for operation of an internal combustion engine, comprising:
    an engine load detecting device producing a signal representative of a load on the engine; and
    an engine controller receiving said signal, said engine controller being configured to determine if said signal is below a predetermined value, said engine controller being further configured to switch an operating torque curve of the engine to one of a plurality of torque power curves dependent upon whether said signal is below said predetermined value, said controller is further configured to utilize an angular acceleration signal representative of an angular acceleration of the engine to select a torque power curve, said controller is further configured to apply a boost curve from said plurality of torque power curves if said angular acceleration is below a predetermined acceleration value.

11. The control system of claim 10, wherein said controller is further configured to substantially maintaining the speed of the engine while the load varies.

12. The control system of claim 10, wherein said predetermined acceleration value is −10 rad/sec$^2$.

13. The control system of claim 10, wherein said controller is further configured to revert the operation of the engine to a previous torque curve from said boost curve dependent upon detecting an event.

14. The control system of claim 13, wherein said event is a passage of a predetermined amount of time in a range of 5 to 10 seconds.

15. The control system of claim 13, wherein said event is at least one of engine speed recovery, torque detection, fuel consumption rate and boost pressure.

16. The control system of claim 10, wherein said controller is further configured to select a torque power curve to at least one of increase fuel efficiency of the engine and maintain exhaust temperature of the engine dependant upon said signal.

* * * * *